US012777566B2

(12) United States Patent
Squillace et al.

(10) Patent No.: US 12,777,566 B2
(45) Date of Patent: Oct. 27, 2026

(54) CONTROL SYSTEM FOR CONFIGURING A PLURALITY OF LIGHTING DEVICES OF A LIGHTING SYSTEM AND A METHOD THEREOF

(71) Applicant: SIGNIFY HOLDING B.V., Eindhoven (NL)

(72) Inventors: Jorge Gabriel Squillace, Eindhoven (NL); Antonie Leonardus Johannes Kamp, San Francisco, CA (US); Daniel Martin Goergen, Eindhoven (NL); Aloys Hubbers, Doetinchem (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 302 days.

(21) Appl. No.: 18/272,389

(22) PCT Filed: Jan. 11, 2022

(86) PCT No.: PCT/EP2022/050373
§ 371 (c)(1),
(2) Date: Jul. 14, 2023

(87) PCT Pub. No.: WO2022/152662
PCT Pub. Date: Jul. 21, 2022

(65) Prior Publication Data

US 2024/0090104 A1 Mar. 14, 2024

(30) Foreign Application Priority Data

Jan. 18, 2021 (EP) .................................... 21151983

(51) Int. Cl.
*H05B 47/155* (2020.01)
*H05B 47/175* (2020.01)
*H05B 47/19* (2020.01)

(52) U.S. Cl.
CPC ........... *H05B 47/155* (2020.01); *H05B 47/19* (2020.01); *H05B 47/196* (2024.01); *H05B 47/198* (2024.01)

(58) Field of Classification Search
None
See application file for complete search history.

(56) References Cited

U.S. PATENT DOCUMENTS 5,769,527 A * 6/1998 Taylor ................ G05B 19/0426 362/85
9,370,078 B2 * 6/2016 Feri ........................ H05B 47/17
(Continued)

FOREIGN PATENT DOCUMENTS

CN 110100503 A 8/2019
EP 2605622 A2 6/2013
(Continued)

*Primary Examiner* — Srinivas Sathiraju

(57) ABSTRACT

A control system for configuring a plurality of lighting devices is disclosed. The control system comprises a communication unit configured to wirelessly communicate with a plurality of lighting devices, a configuration module configured to: for each lighting device of the plurality of lighting devices, group different segments of the plurality of individually controllable segments into different lighting control groups, and communicate, via one or more communication units, grouping information to each respective lighting device to cause the respective lighting device to store the respective grouping information in its memory, the grouping information being indicative of the respective lighting control groups into which the different segments have been grouped, and a control module configured to: communicate, via the one or more communication units, a broadcast command to the plurality of lighting devices, the broadcast command defining respective light settings for the respective lighting control groups.

18 Claims, 6 Drawing Sheets

(56) References Cited

U.S. PATENT DOCUMENTS

| | | | | |
|---|---|---|---|---|
| 9,794,998 | B2 | 10/2017 | Hidaka et al. | |
| 10,834,804 | B1* | 11/2020 | McRae | F21S 10/02 |
| 11,743,996 | B1* | 8/2023 | Udall | H05B 47/115<br>315/291 |
| 12,302,470 | B2* | 5/2025 | Aliakseyeu | H05B 47/125 |
| 2012/0262076 | A1* | 10/2012 | Briggs | F21K 9/60<br>315/192 |
| 2013/0313983 | A1* | 11/2013 | Radermacher | H05B 45/3578<br>315/193 |
| 2013/0328502 | A1* | 12/2013 | Hovey | H05B 47/195<br>315/307 |
| 2015/0366035 | A1* | 12/2015 | Baek | H05B 47/10<br>315/297 |
| 2016/0029458 | A1* | 1/2016 | Liu | G05B 19/042<br>700/32 |
| 2016/0227632 | A1* | 8/2016 | Zhang | H05B 47/185 |
| 2017/0253336 | A1* | 9/2017 | Matsui | H05B 45/22 |
| 2018/0145536 | A1* | 5/2018 | Nelson | H02J 9/02 |
| 2018/0153024 | A1* | 5/2018 | Hadachi | H05B 47/115 |
| 2018/0206312 | A1* | 7/2018 | Aliakseyeu | H05B 45/10 |
| 2018/0288851 | A1* | 10/2018 | Rozendaal | H05B 47/155 |
| 2019/0182942 | A1* | 6/2019 | Kamp | H05B 45/00 |
| 2019/0230773 | A1* | 7/2019 | Kamp | G05B 15/02 |
| 2019/0342982 | A1* | 11/2019 | Barna | G01S 19/14 |
| 2020/0205252 | A1* | 6/2020 | Chen | H05B 45/10 |
| 2020/0281064 | A1* | 9/2020 | Newton | F21S 4/24 |
| 2020/0323054 | A1* | 10/2020 | Kim | H04W 84/02 |
| 2021/0045220 | A1* | 2/2021 | Barna | A61M 21/00 |
| 2021/0084733 | A1* | 3/2021 | Hamm | G06F 3/0482 |
| 2021/0259077 | A1* | 8/2021 | Squillace | H05B 45/46 |
| 2023/0199929 | A1* | 6/2023 | Squillace | H05B 45/12<br>315/151 |
| 2023/0262863 | A1* | 8/2023 | Aliakseyeu | H05B 47/125<br>315/294 |
| 2023/0328866 | A1* | 10/2023 | O'Donnell | H05B 47/115<br>315/291 |
| 2024/0090104 | A1* | 3/2024 | Squillace | H05B 47/155 |

FOREIGN PATENT DOCUMENTS

| | | | | | |
|---|---|---|---|---|---|
| JP | 2013038048 | A | | 2/2013 | |
| JP | 2013506247 | A | | 2/2013 | |
| JP | 2014056670 | A | | 3/2014 | |
| JP | 2020522840 | A | | 7/2020 | |
| WO | WO-2022152662 | A1 | * | 7/2022 | H05B 47/196 |

* cited by examiner

CONTROL SYSTEM FOR CONFIGURING A PLURALITY OF LIGHTING DEVICES OF A LIGHTING SYSTEM AND A METHOD THEREOF

CROSS-REFERENCE TO PRIOR APPLICATIONS

This application is the U.S. National Phase application under 35 U.S.C. § 371 of International Application No. PCT/EP2022/050373, filed on Jan. 11, 2022, which claims the benefit of European Patent Application No. 21151983.0, filed on Jan. 18, 2021. These applications are hereby incorporated by reference herein.

FIELD OF THE INVENTION

The invention relates to a control system for configuring a plurality of lighting devices of a lighting system. The invention further relates to a lighting system comprising a plurality of lighting devices and the control system. The invention further relates to a method of configuring a plurality of lighting devices of a lighting system and to a computer program product for executing the method.

BACKGROUND

Current home systems comprise a plurality of controllable lighting devices. In such systems, the lighting devices can be controlled based on media content that is being rendered on a display. A user may, for example, play a movie or a game on the display of a display device (e.g. a television, a pc monitor, a tablet pc, a projector, etc.). The lighting devices may be controlled based on the media content that is being rendered on the display, for instance by analyzing colors of images that are rendered on the display and by controlling the lighting devices accordingly. Alternatively, the lighting devices may be controlled according to a light script which comprises pre-programmed lighting control instructions for the lighting devices. The lighting control instructions are communicated to the lighting devices to control them in sync with the media content that is being rendered on the display. This brings the atmosphere of the movie or the game into the room of the user.

The lighting control instructions that are transmitted to the lighting devices depend on the location of the lighting devices relative to the display, the space, a user, etc., such that locations of on-screen events (e.g. an explosion, a sunset, an object approaching from one side of the display, etc.) correspond to locations of light effects generated by the lighting devices. It is desirable that when such an on-screen event occurs, the lighting devices in the space are controlled in a synchronized manner. This becomes difficult when the number of lighting devices increases in the space, especially when the lighting devices comprise multiple individually controllable segments. For instance, light strips or lighting tiles comprise such segments (which each comprise one or more light sources) that can be controlled individually. This requires that multiple control commands are to be transmitted to the different lighting devices to control the individually controllable segments. A disadvantage of this is that present (home) lighting control systems are not capable of handling this amount of control commands, resulting in that the lighting devices (and their segments) are not controlled in a synchronized manner, that the light effects have a latency and/or that the transitions between light effects are less smooth.

U.S. Ser. No. 10/834,804 B1 discloses an apparatus and associated methods related to configuring a decorative lighting zone with a zone controller adapted to independently control the lighting in the lighting zone, programming the zone controller to implement a lighting command received from a remote control, and automatically providing a remotely configurable lighting display in the lighting zone based on independently activating the lighting command in the zone controller. The lighting command may be a lighting sequence. The lighting zone may be, for example, a multi-color light displaying time-varying artificial tree lighting patterns. In some examples, the zone controller may be a multi-zone controller adapted to permit the remote control to independently program and activate multiple zones.

SUMMARY OF THE INVENTION

It is an object of the present invention to provide a lighting control system that is able to control a plurality of lighting devices each comprising a plurality of individually controllable segments in an improved manner.

According to a first aspect of the present invention, the object is achieved by a control system for configuring a plurality of lighting devices of a lighting system, each lighting device comprising a memory and a plurality of individually controllable segments, each segment comprising one or more light sources, wherein the control system comprises:

- a communication unit configured to wirelessly communicate with the plurality of lighting devices,
- a configuration module configured to:
- for each lighting device of the plurality of lighting devices, group different segments of the plurality of individually controllable segments into different lighting control groups, and
- communicate, via the one or more communication units, grouping information to each respective lighting device to cause the respective lighting device to store the respective grouping information in its memory, the grouping information being indicative of the respective lighting control groups into which the different segments have been grouped, and
- a control module configured to:
- communicate, via the one or more communication units, a broadcast command to the plurality of lighting devices, the broadcast command defining respective light settings for the respective lighting control groups.

Different individually controllable segments of the different lighting devices are grouped into different lighting control groups. A lighting control group defines a group of segments that are to be controlled as a group according to the same light setting. This grouping information is then communicated to each lighting device, to cause each lighting device to store its respective grouping information in its memory. This enables the lighting devices to, when receiving lighting control commands targeted at the specific groups, to control the different segments accordingly. The control module communicates a broadcast command to each of the plurality of lighting devices. The broadcast command defines respective light settings for the respective lighting control groups. This enables the lighting devices to control one or more light sources of each segment according to the respective light setting. By transmitting a broadcast command (instead of unicasts to the individual lighting devices and/or their segments), control of the different segments of the different lighting devices is executed in a synchronized manner. Additionally, due to the reduced number of commands, the latency of the light effects is reduced and transitions between light effects are smoother. Hence, this control system provides the benefit that it improves the user experience of the lighting system and optimally uses network resources of the lighting system.

The configuration module may be configured to group the different segments of the plurality of individually controllable segments into the different lighting control groups such that at least one first segment of a first lighting device of the plurality of lighting devices and at least one second segment of a second lighting device of the plurality of lighting devices are grouped in the same lighting control group. The broadcast command may comprise a light setting for that same lighting control group, such that one or more light sources of the at least one first segment (of the first lighting device) and that one or more light sources of the at least one second segment are controlled according to the (same) light setting. This is beneficial, because different segments of different lighting devices are controlled (in a synchronized manner) by the same broadcast command.

The number of groups (into which the segments of the lighting devices are to be grouped) may be limited. The maximum number of lighting control groups may be smaller than the number of segments of the plurality of lighting devices. The configuration module may therefore be configured to group at least two segments in the same lighting control group. The at least two segments may be segments of a single lighting device. Additionally or alternatively, the at least two segments may be segments of a different lighting devices. The size (i.e. the amount of data) of the broadcast command may be limited, thereby limiting the number of available groups (e.g. max. 20 groups). Therefore, it may be necessary to group different segments into the same lighting control group.

The configuration module may be further configured to, for each lighting device of the plurality of lighting devices, determine adjustment levels for one or more segments of the respective lighting device, the adjustment levels defining adjustments of the light output of one or more light sources of the respective segment, and to communicate the adjustment levels to each respective lighting device to cause the respective lighting device to store the respective adjustment levels in its memory. The lighting devices may then, when the segments are controlled based on the broadcast command according to the grouping, adjust the light output of one or more light sources of the respective segment. Such adjustments may be required, for instance, when certain light sources are closer to an illuminated surface, when reflective properties of to be illuminated surfaces are different for different segments, when segments are closer to a user and/or a media rendering device compared to other segments, etc. These adjustment levels may be different for different lighting devices (and segments). It is beneficial to store the adjustment levels in the lighting devices, because then the broadcast command does not need to define these for the different segments of different lighting devices. The broadcast command defines the light settings for all respective control groups, and the lighting devices adjust the light outputs of the respective segments only if there's an adjustment level present in the respective memory for a respective segment. The adjustment levels may define an adjustment of a color, brightness and/or saturation of the light output.

Additionally or alternatively, the configuration module may be further configured to: for each lighting device of the plurality of lighting devices, determine an adjustment level for the respective lighting device, the adjustment level defining adjustments of the light output of light sources of the lighting device, and to communicate the adjustment levels to each respective lighting device to cause the respective lighting device to store the respective adjustment levels in its memory. Each lighting device may then, when the segments are controlled based on the broadcast command according to the grouping, adjust the light output of one or more light sources of the lighting device. Such adjustments may be required depending on the distance to an illuminated surface, depending on the reflective properties of to be illuminated surfaces, depending on a distance of the lighting device relative to a user and/or a media rendering device compared, etc. Another reason for applying the adjustments are differences of light output characteristics (e.g. differences in color rendering characteristics, differences in minimum/maximum brightness, etc.) between different lighting devices. These adjustment levels may be different for different lighting devices. It is therefore beneficial to store the adjustment levels in the lighting devices, because then the light settings defined in the broadcast command are the same for all respective control groups, and the lighting devices adjust the light outputs of their light sources in dependence on the adjustment level present in their respective memories. The adjustment levels may define an adjustment of a color, brightness and/or saturation of the light output.

The configuration module may be further configured to obtain information indicative of locations of (segments of) lighting devices relative to a surface to be illuminated by (the respective segment of) the lighting devices, and to determine the adjustment levels based on the locations of (the segments of) the lighting devices relative to the surface to be illuminated by the (respective segment) of the lighting devices. The information indicative of locations of (segments of) lighting devices relative to a surface to be illuminated by the (respective segment) of the lighting devices may, for example, be obtained from an indoor positioning system, based on user input received via a user interface, based on senor input received from sensors comprised in or in proximity of the lighting devices, etc. These adjustment levels may be different for different lighting devices (and segments). It is therefore beneficial to store the adjustment levels in the lighting devices, because then the light settings defined in the broadcast command are the same for all respective control groups, and the lighting devices adjust the light outputs of the light sources only if there's an adjustment level present in the respective memory for that lighting device (or a respective segment).

The configuration module may be configured to determine the grouping of the different segments into the different lighting control groups based on positions of the lighting devices and/or their segments. The configuration module may, for example, be configured to determine the lighting control groups based on positions of the lighting devices and/or their segments relative to a space, relative to a predefined position in the space, relative to each other, relative to a device or an object, relative to a user, etc. It is beneficial to determine the groups based on the positions of the segments because it enables grouping of proximate segments. This may be further beneficial if the maximum number of lighting control groups is limited.

The control system may further comprise a user interface configured to receive user input indicative of the grouping of the different segments of the plurality of individually controllable segments into the different lighting control groups. A user operating the control system may indicate the groups via the user interface.

The light settings defined by the broadcast command may comprise lighting control instructions for controlling the light properties (e.g. the brightness, color, saturation, beam shape/size/direction, etc.) of the segments of the respective lighting control groups. In various examples, a light setting defined by the broadcast command comprise an off-setting for a respective lighting control group, and another light setting defined by the broadcast command may comprise an on-setting for another lighting control group.

According to a second aspect of the present invention, the object is achieved by a lighting system comprising:

a plurality of lighting devices, each comprising a memory and a plurality of individually controllable segments, each segment comprising one or more light sources, and the control system, wherein each lighting device is configured to:

receive the respective grouping information, store the respective grouping information in its memory, receive the broadcast command, determine which segment to control according to which light setting based on the control command and based on the grouping information, and control one or more light sources of each segment according to the respective light setting.

The lighting devices may each comprise a receiver for receiving the grouping information and the broadcast command. This enables the lighting devices to, when receiving lighting control commands targeted at the specific groups, to control the different segments accordingly.

One or more of the plurality of lighting devices may be light source arrays. The light source array may be a one-dimensional array (e.g. an LED strip/string), a two-dimensional array (e.g. an LED tile) or a three-dimensional array (e.g. an LED cube).

According to a third aspect of the present invention, the object is achieved by a method of configuring a plurality of lighting devices of a lighting system, each lighting device comprising a memory and a plurality of individually controllable segments, each segment comprising one or more light sources, the method comprising:

for each lighting device of the plurality of lighting devices, grouping different segments of the plurality of individually controllable segments into different lighting control groups, and communicating, via one or more communication units, grouping information to each respective lighting device to cause the respective lighting device to store the respective grouping information in its memory, the grouping information being indicative of the respective lighting control groups into which the different segments have been grouped, and communicating, via the one or more communication units, a broadcast command to the plurality of lighting devices, the broadcast command defining respective light settings for the respective lighting control groups.

The method may further comprise the steps of:

receiving, by each of the plurality of lighting devices, the respective grouping information, storing, by each of the plurality of lighting devices, the respective grouping information in its memory, receiving, by each of the plurality of lighting devices, the broadcast command, determining, by each of the plurality of lighting devices, which segment to control according to which light setting based on the control command and based on the grouping information, and controlling, by each of the plurality of lighting devices, one or more light sources of each segment according to the respective light setting.

According to a fourth aspect of the present invention, the object is achieved by a computer program product for one or more computing devices, the computer program product comprising computer program code to perform the method when the computer program product is run on one or more processing units of the one or more computing devices. Respective steps of the method may be executed by corresponding (processing) elements of the control/lighting system.

It should be understood that the lighting system, the methods and the computer program products may have similar and/or identical embodiments and advantages as the above-mentioned control system.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
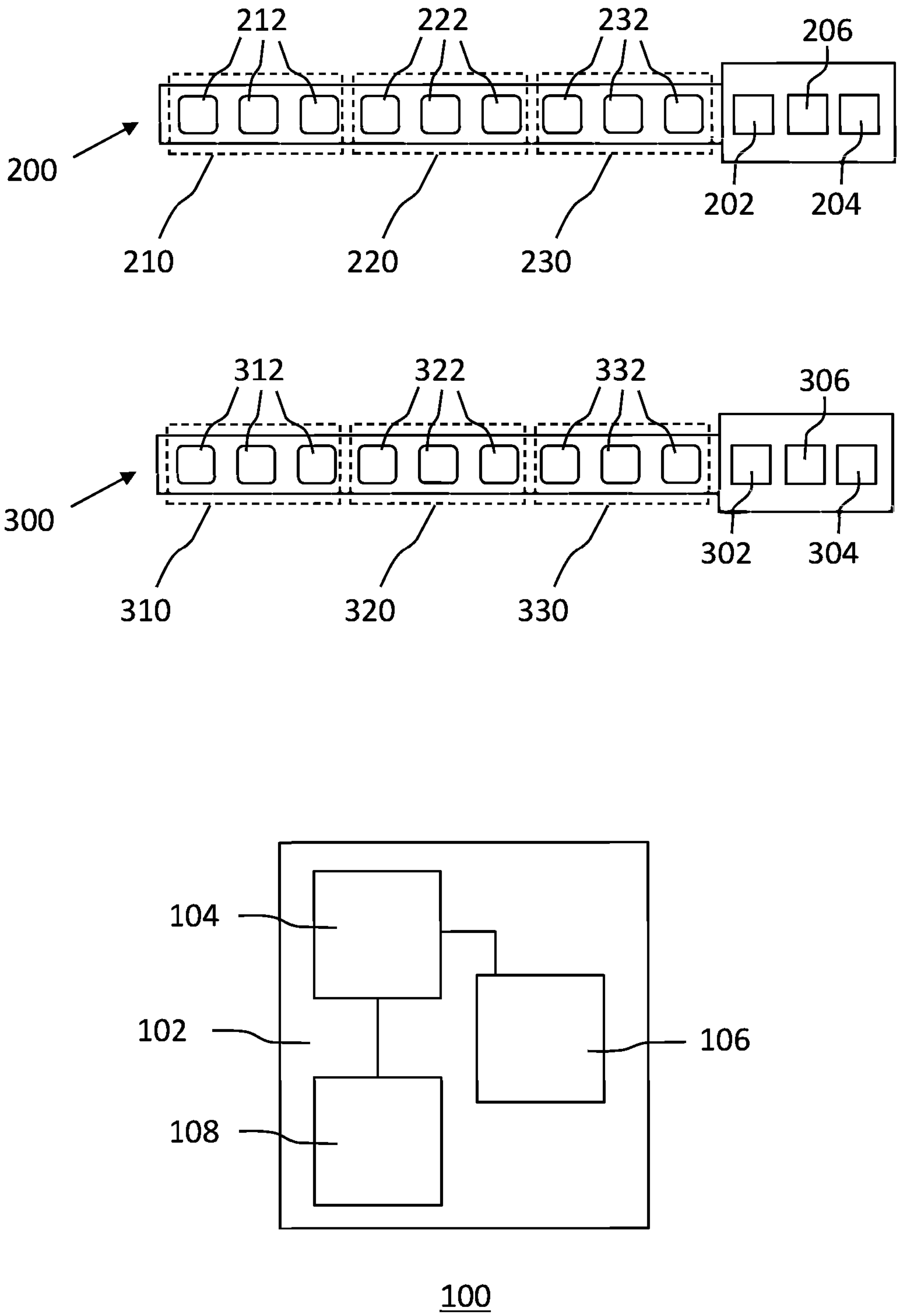
FIG. 1 shows schematically an example of a lighting system comprising a control system and a plurality of lighting devices comprising individually controllable segments, each segment comprising a plurality of light sources.

FIG. 1 shows schematically a lighting system 100 comprising a control system 102 and a plurality of lighting devices 200, 300. Each lighting device comprises a memory 202, 302 and a plurality of individually controllable segments 210, 220, 230, 310, 320, 330, each segment comprising one or more of light sources 212, 222, 232, 312, 322, 332 (e.g. LED light sources). Each lighting device further comprises a receiver 204, 304 and a controller 206, 306 (e.g. one or more processors) operatively coupled to the receiver, the memory and the plurality of light sources. The lighting devices 206, 306 may be any type of lighting device comprising a plurality of individually controllable (addressable) lighting segments that each comprise one or more (LED) light sources. The lighting device may for example be a one-dimensional array (e.g. an LED strip/string), a two-dimensional array (e.g. an LED tile) or a three-dimensional array (e.g. an LED cube). The lighting device may be embedded in a peripheral device such as a keyboard, a computer mouse, a game controller, a PC casing, etc. The control system 102 comprises one or more communication units 104 configured to wirelessly communicate with the plurality of lighting devices, a configuration module 106 and a control module 108.

The control system 102 may be any type of control system for configuring and controlling the plurality of lighting devices 200, 300 of the lighting system 100. In the example of FIG. 1, the configuration module 106 and the control module 108 are comprised in a single device (e.g. a central lighting control device such as a smartphone, a bridge, a hub, a remote server, etc.). It should be understood that this is an example and that, depending on the system architecture, the configuration module 106, the control module 108 and the one or more communication units 104 may be distributed across different devices. The configuration module 106 and the control module 108 may, for example, be comprised in separate devices, each with its own communication unit 104 for communicating with the lighting devices 200, 300. The configuration module 106 and the control module 108 may run on one or more processors (e.g. circuitry, microcontrollers, etc.) of the control system 102.

The control system 102 comprises one or more communication units 104 configured to wirelessly communicate with the lighting devices 200, 300. The communication unit may communicate configuration information (such as grouping information) and lighting control commands to the lighting devices 200, 300 to configure and control them. The communication unit may comprise hardware for communicating via one or more wireless communication protocols, for example Bluetooth, Wi-Fi, Li-Fi, 3G, 4G, 5G or ZigBee. A specific communication technology may be selected based on the communication capabilities of the lighting devices, the power consumption of the communication driver for the wireless communication technology and/or the communication range of the signals.

The control system 102 further comprises a configuration module 106 for configuring the lighting devices 200, 300. The configuration module 106 is configured to, for each lighting device of the plurality of lighting devices 200, 300, group different segments of the plurality of individually controllable segments 210, 220, 230, 310, 320, 330 into different lighting control groups. The configuration module 106 is further configured to communicate, via the one or more communication units 104, grouping information to each respective lighting device to cause the respective lighting device to store the respective grouping information in its memory, the grouping information being indicative of the respective lighting control groups into which the different segments have been grouped. The configuration module 106 may, for example, associate the segments 210, 220, 230 of a first lighting device 200 with respective lighting control groups, and associate the segments 310, 320, 330 of a second lighting device 300 with respective lighting control groups. This grouping information is then communicated to the lighting devices 200, 300. The lighting devices 200, 300 are configured to receive the grouping information and store the associations between the different segments in their respective memories. Lighting device 200 may receive the associations between its segments 210, 220, 230 and the lighting control groups via its communication unit 204 and its controller 206 may store these associations in its memory 202. Similarly, lighting device 300 may receive the associations between its segments 310, 320, 330 and the lighting control groups via its communication unit 304 and its controller 306 may store these associations in its memory 302. The configuration module 106 may be configured to (e.g. periodically, upon request of the lighting devices 200, 300, upon request of a lighting control device, upon request of a user, etc.) update the grouping information and communicate the updated grouping information to the lighting devices 200, 300.

Figure 2:
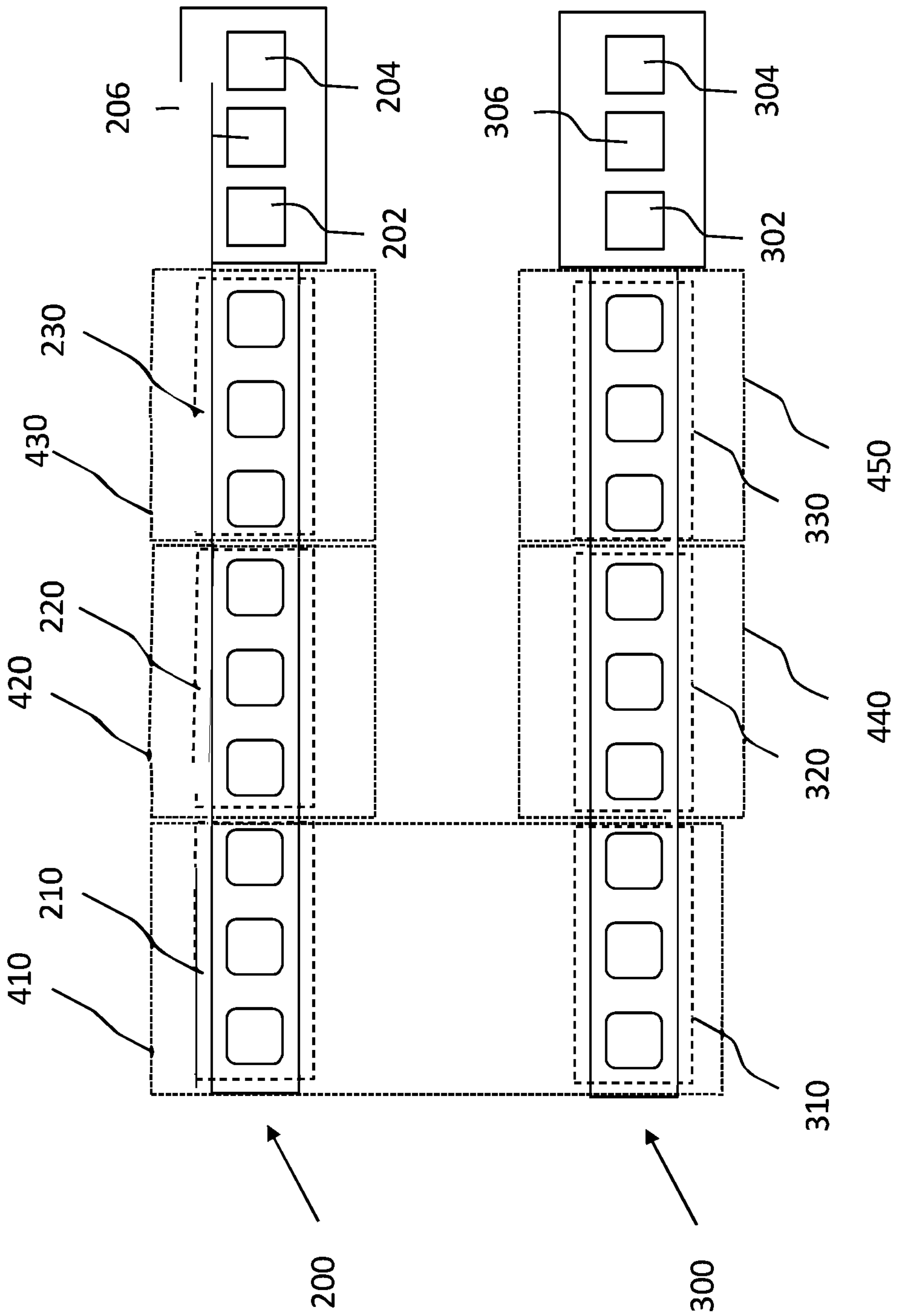
FIG. 2 shows schematically an example of grouping of different segments of the lighting devices of FIG. 1 into different control groups.

The lighting devices 200, 300 may be configured to store different grouping information sets. The configuration module 106 may, for example, communicate first grouping information to the lighting devices 200, 300, and communicate second grouping information to the lighting devices 200, 300, which may both be stored in the respective memories 202, 302. The lighting devices 200, 300 may be configured to receive a command (e.g. from the configuration module 106 or from the control module 108), and activate one of the received grouping information. The first grouping information may, for example, be related to control of the lighting devices based on first media content (e.g. video content rendered on a display), and the second grouping information may, for example, be related to control of the lighting devices based on a different source than the first media content (e.g. based on second media content, based on a location of a user, etc.). This is beneficial because it enables switching between groupings of segments by transmitting a command to the lighting devices 200, 300 instructing the lighting devices 200, 300 to switch. FIG. 2 shows another example of grouping segments into a plurality of lighting control groups. Here, the configuration module 102 may group the different segments of the plurality of individually controllable segments 210, 220, 230, 310, 320, 330 into the different lighting control groups 410, 420, 430, 440, 450 such that at least one first segment 210 of the first lighting device 200 and at least one second segment 310 of the second lighting device 300 are grouped in the same lighting control group 410. In this example of FIG. 2, segment 220 is grouped into lighting control group 420, segment 230 is grouped into lighting control group 430, segment 320 is grouped into lighting control group 440 and segment 330 is grouped into lighting control group 450. This grouping information is then communicated to the lighting devices 200, 300. The lighting devices 200, 300 are configured to receive the grouping information and store the associations between the different segments in their respective memories 202, 306. Lighting device 200 may receive the associations between its segments 210, 220, 230 and respective lighting control groups 410, 420, 430 via its communication unit 204 and its controller 206 may store these associations in its memory 202. Similarly, lighting device 300 may receive the associations between its segments 310, 320, 330 and respective lighting control groups 410, 440, 450 via its communication unit 304 and its controller 306 may store these associations in its memory 302.

The control system 102 further comprises a control module 108 configured to communicate, via the one or more communication units 104, a broadcast command to the plurality of lighting devices 200, 300, the broadcast command defining respective light settings for the respective lighting control groups. The broadcast command is a lighting control command for controlling the light output of the light sources 212, 222, 232, 312, 32, 332 of the lighting devices 200, 300. The broadcast command may be addressed to the lighting devices 200, 300, and comprise control instructions for controlling the light output of the light sources 212, 222, 232, 312, 32, 332 of the different lighting control groups. By transmitting the broadcast command (instead of unicasts to the individual lighting devices and/or their segments), control of the different segments of the different lighting devices 200, 300 is executed in a substantially synchronized manner. The broadcast command defines light settings (e.g. lighting control instructions for controlling one or more light properties of the light sources) of the respective lighting control groups. The broadcast command may comprise light settings for a lighting control group that is not associated with any segment of a first lighting device, but only with a segment of a second lighting device. This is illustrated below. Referring again to FIG. 2, Table 1 shows schematically an example of a broadcast command comprising light settings for the different lighting control groups:

TABLE 1

| Lighting control group | Light setting |
|---|---|
| 410 | 1 |
| 420 | 2 |
| 430 | 3 |
| 440 | 4 |
| 450 | 5 |

When the first lighting device 200 receives the broadcast command, its controller 206 determines if one or more segments are associated with one or more lighting control groups defined by the broadcast command. In this example, segment 210 is associated with lighting control group 410, segment 220 is associated with lighting control group 420 and segment 230 is associated with lighting control group 430. This grouping information is stored in the memory 202. Consequently, the controller 206 of the first lighting device 200 will control the light sources of segment 210 according to light setting 1, the light sources of segment 220 according to light setting 2 and the light sources of segment 230 according to light setting 3. Similarly, when the second lighting device 300 receives the broadcast command, its controller 306 determines if one or more segments are associated with one or more lighting control groups defined by the broadcast command. In this example, segment 310 is associated with lighting control group 410, segment 320 is associated with lighting control group 440 and segment 330 is associated with lighting control group 450. Consequently, the controller 306 of the second lighting device 300 will control the light sources of segment 310 according to light setting 1, the light sources of segment 320 according to light setting 4 and the light sources of segment 330 according to light setting 5. In table 1, the light settings are shown as numerical values (which may correspond to lighting control values stored in the memories of the lighting devices), but other examples of light settings may include RGB values, XY values in the CIE color spectrum, beam shape/size/direction control values, etc. A light setting defined by the broadcast command may comprise an off-setting for a lighting control group. Communicating light control settings to lighting devices are known in the art and will therefore not be discussed in detail.

The number of groups (into which the segments of the lighting devices 200, 300 are to be grouped) may be limited. The maximum number of lighting control groups may be smaller than the number of segments of the plurality of lighting devices. For instance, referring to FIG. 2, the maximum number of lighting control groups may be 5 lighting control groups. The configuration module 106 may therefore be configured to group at least two segments in the same lighting control group. The at least two segments may be segments of a different lighting devices (as shown in FIG. 2). Alternatively, the at least two segments may be segments of a single lighting device. The size (i.e. the amount of data) of the broadcast command may be limited, thereby limiting the number of available groups (e.g. max. 20 groups). Therefore, it may be necessary to group different segments into the same lighting control group.

The configuration module 106 may be further configured to, for each lighting device of the plurality of lighting devices 200, 300, determine adjustment levels for one or more segments of the respective lighting device, the adjustment levels defining adjustments of the light output of one or more light sources of the respective segment. Such adjustments may be required, for instance, when certain light sources are closer to an illuminated surface, when reflective properties of to be illuminated surfaces are different for different segments, when segments are closer to a user and/or a media rendering device compared to other segments, etc. The configuration module 106 may be further configured to communicate the adjustment levels via the communication unit 104 to each respective lighting device to cause the respective lighting device to store the respective adjustment levels in its memory 202, 302. The lighting devices 200, 300 are configured to receive the respective adjustment levels via their respective receivers 204, 304, and to store the adjustment levels in their respective memories 202, 302. The controllers 206, 306 of the lighting devices 200, 300 may then, when the segments are controlled based on the broadcast command according to the grouping, take the adjustment levels into account when the segments are controlled. Table 2 illustrates examples of adjustment levels for the segments 210, 220, 230 of the first lighting device 200 stored in its memory 202.

TABLE 2

| Segment | Adjustment level |
|---|---|
| 210 | Brightness: 100% |
| 220 | Brightness: 80% |
| 230 | Brightness: 60% |

When the first lighting device 200 receives the broadcast command, it controls its segments 210, 220, 230 according to the light settings defined by the broadcast command and apply the adjustments as defined in the memory. For instance, the light settings defined in the broadcast command may be a first color for a first lighting control group (e.g. the first segment 210), a second color for a second lighting control group (e.g. the second segment 220) and a third color for a third lighting control group (e.g. the third segment 230), and the controller 206 of the first lighting device 200 may then, referring to Table 2, adjust the brightness of these segments accordingly (100% brightness for the light sources of the first segment 210, 80% brightness for the light sources of the second segment 220 and 60% brightness for the light sources of the third segment 230). In the example of FIG. 2, the adjustment levels are related to the brightness. Other examples of adjustment levels may be adjustments of other light properties, such as the color, saturation, beam shape/size/direction, etc., of light sources of the different segments. The configuration module 106 may be further configured to obtain information indicative of locations of segments relative to a surface to be illuminated by the respective segment, and to determine the adjustment levels based on the locations of the segments relative to the surface to be illuminated by the respective segment. The information indicative of locations of segments relative to a surface to be illuminated by the respective segment may, for example, be obtained from an indoor positioning system, based on user input received via a user interface, based on senor input received from sensors comprised in or in proximity of the lighting devices, etc.

Additionally or alternatively, the configuration module 106 may be further configured to, for each lighting device of the plurality of lighting devices 200, 300, determine an adjustment level for the respective lighting device, the adjustment level defining adjustments of the light output of light sources of the lighting device, and to communicate the adjustment levels to each respective lighting device to cause the respective lighting device to store the respective adjustment level in its memory. Each lighting device may then, when the segments are controlled based on the broadcast command according to the grouping, adjust the light output of one or more light sources of the lighting device in a similar manner as described above.

Figure 3A:
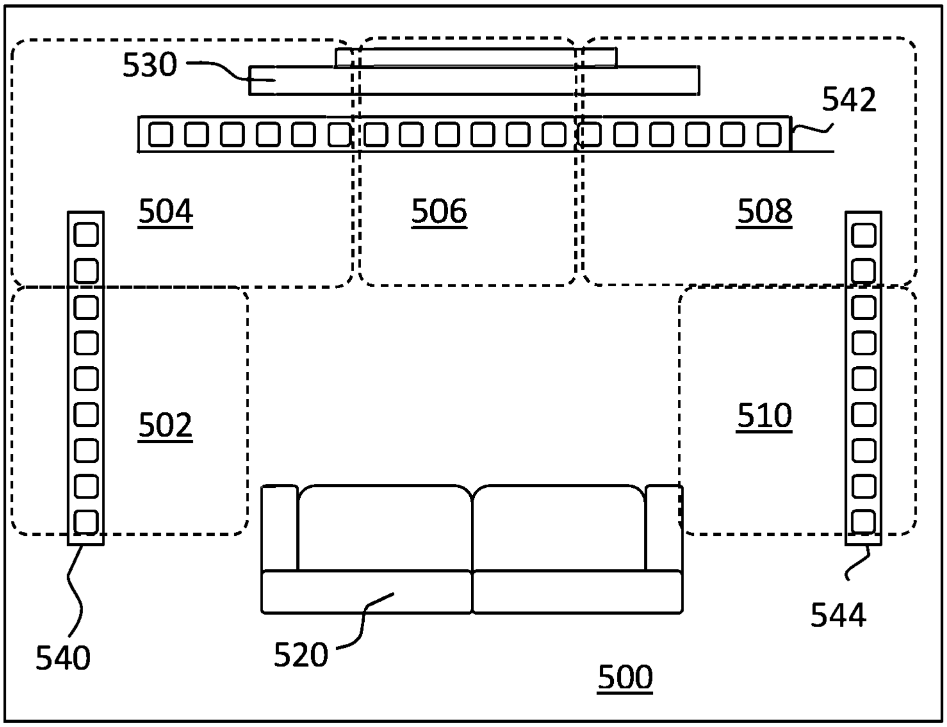
FIGS. 3*a*, 3*b*, 4*a*, 4*b* show schematically examples of a space comprising a plurality of lighting devices and subareas of the space indicative of lighting control groups.

The configuration module 106 may be configured to determine the grouping of the different segments into the different lighting control groups based on positions of the lighting devices 200, 300 and/or their segments 210, 220, 230, 310, 320, 330. The configuration module 106 may be further configured to obtain position information indicative of the positions of the lighting devices 200, 300 and/or their segments 210, 220, 230, 310, 320, 330. The position information may, for example, be obtained from a positioning system such as an RF-based positioning system or a coded light positioning system, via a user interface wherein the user can position the lighting devices in a virtual space, from the lighting devices, etc. Techniques for obtaining positions of lighting devices are known in the art and will therefore not be discussed in detail. The position information may be indicative of the positions of the lighting devices 200, 300 and/or their segments 210, 220, 230, 310, 320, 330 relative to a space, relative to an object, relative to a (media rendering) device, relative to a user, relative to each other, etc. The configuration module 106 may configured to determine the grouping based on the position information. For instance, the configuration module 106 may group all segments located in a first subarea of the space wherein the lighting devices are located into a first lighting control group, and group all segments located in a second subarea of the space wherein the lighting devices are located into a second lighting control group. FIGS. 3*a*, 3*b* and 4*a*, 4*b* illustrate examples of grouping segments of lighting devices into different lighting control groups based on their positions. In these examples the squares of the lighting devices illustrate individually controllable segments of the lighting devices. For instance, in FIG. 3*a*, the segments of the lighting devices 540, 542, 544 are grouped based on their locations relative to the space. In FIG. 3*a*, the space 500 comprises five subareas 502, 504, 506, 508, 510, and based on the locations of the lighting devices, 540, 542, 544, the configuration module 106 may group the individual segments accordingly.

The configuration module 106 may be configured to obtain area information indicative of subareas of the space wherein the lighting system 100 has been installed, wherein each subarea defines one or more lighting control groups. Segments of lighting devices located in these subareas may then be grouped into the lighting control groups accordingly. The subareas may be predefined or determined by the configuration module, for instance based on user input or based on locations of objects, users and or devices in the space.

Figure 3B:
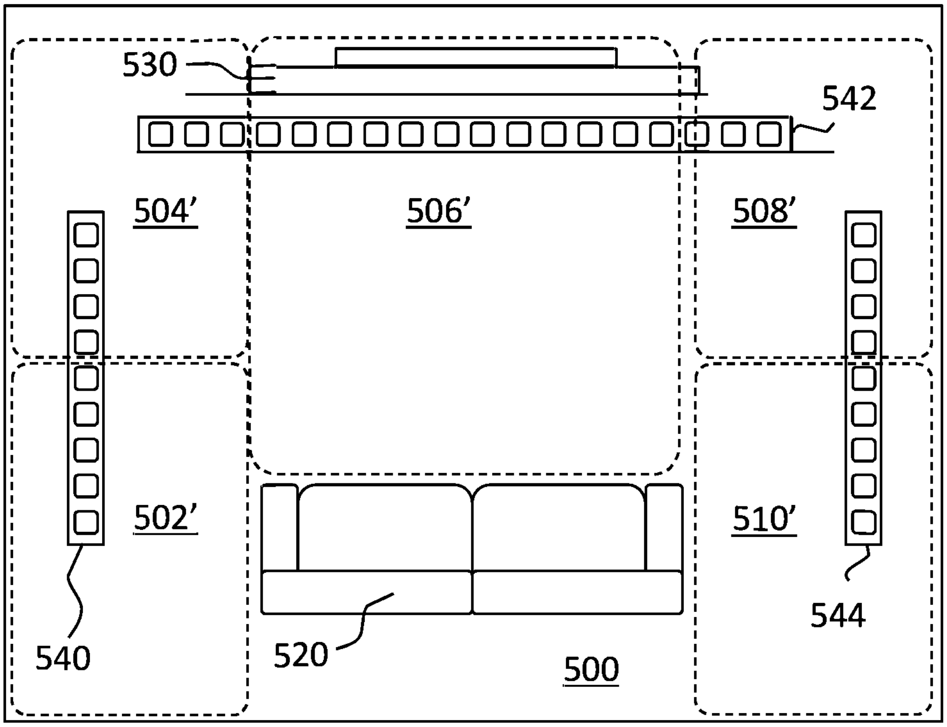
Figure 4A:
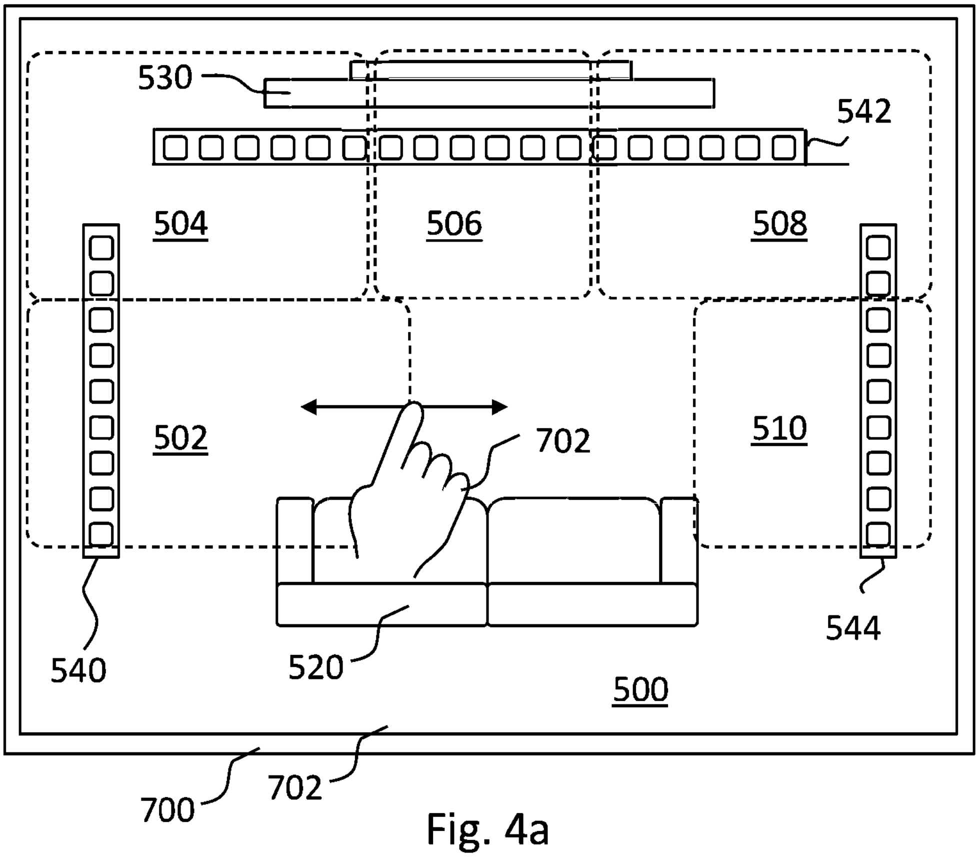
Figure 4B:
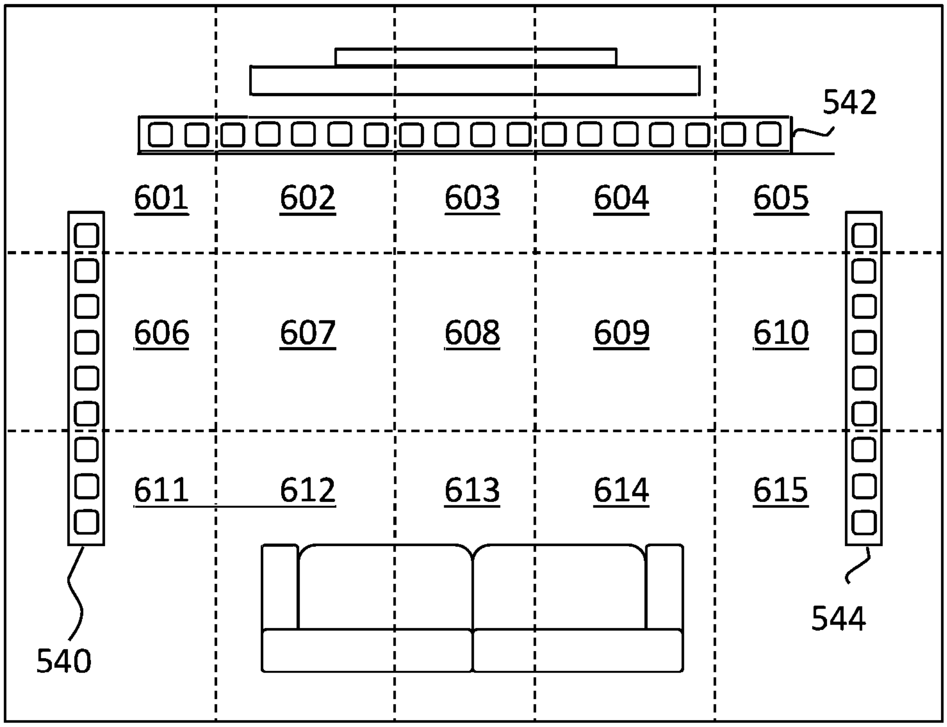

The configuration module 106 may be configured to determine a number, locations and/or sizes of the subareas based on information about the space 500 (e.g. the dimensions, the type of space, etc.), a position of an object, device and/or user in the space 500. The position information of the object(s), user(s) and/or device(s) may, for example, be obtained from a positioning system such as an RF-based positioning system or a coded light positioning system, via a user interface wherein the user can position devices and objects in a virtual space, etc. Techniques for obtaining positions of objects, users and/or devices are known in the art and will therefore not be discussed in detail. In FIG. 3*a*, for example, the locations of the subareas may have been determined relative to the media rendering device 530. The subareas may be positioned such that there's a central subarea 506, a front-left subarea 504, a rear-left subarea 502, a front-right subarea 508 and a rear-right subarea 510 relative to the media rendering device (i.e. a tv in this example). FIG. 3*b* illustrates an example wherein the locations and sizes of the subareas have been determined based on the location of the object 520 (i.e. the couch) in the space 500. The sizes and locations of the subareas 502', 504', 506', 508', 510' have been selected such that they enclose the object 520 and substantially fill the space 500. Based on the locations of the lighting devices, 540, 542, 544, the configuration module 106 may group the individual segments accordingly. In other examples, a user may change the size and locations of the subareas. FIG. 4*a* illustrates an example of a user input device 700 comprising a display 702 which renders a virtual representation of the space 500 of the example of FIG. 3*a*. In this example, the user adjusts the size of subarea 502 by providing a user input 704 (e.g. via a touchscreen, via a peripheral device such as a computer mouse, etc.). FIG. 4*b* illustrates another example of a space that comprises grid lines (which may be predefined, determined, user-based, etc.) that divide the space into a plurality of subareas 601-615. Based on the locations of the lighting devices, 540, 542, 544, the configuration module 106 may group the individual segments accordingly.

Figure 5:
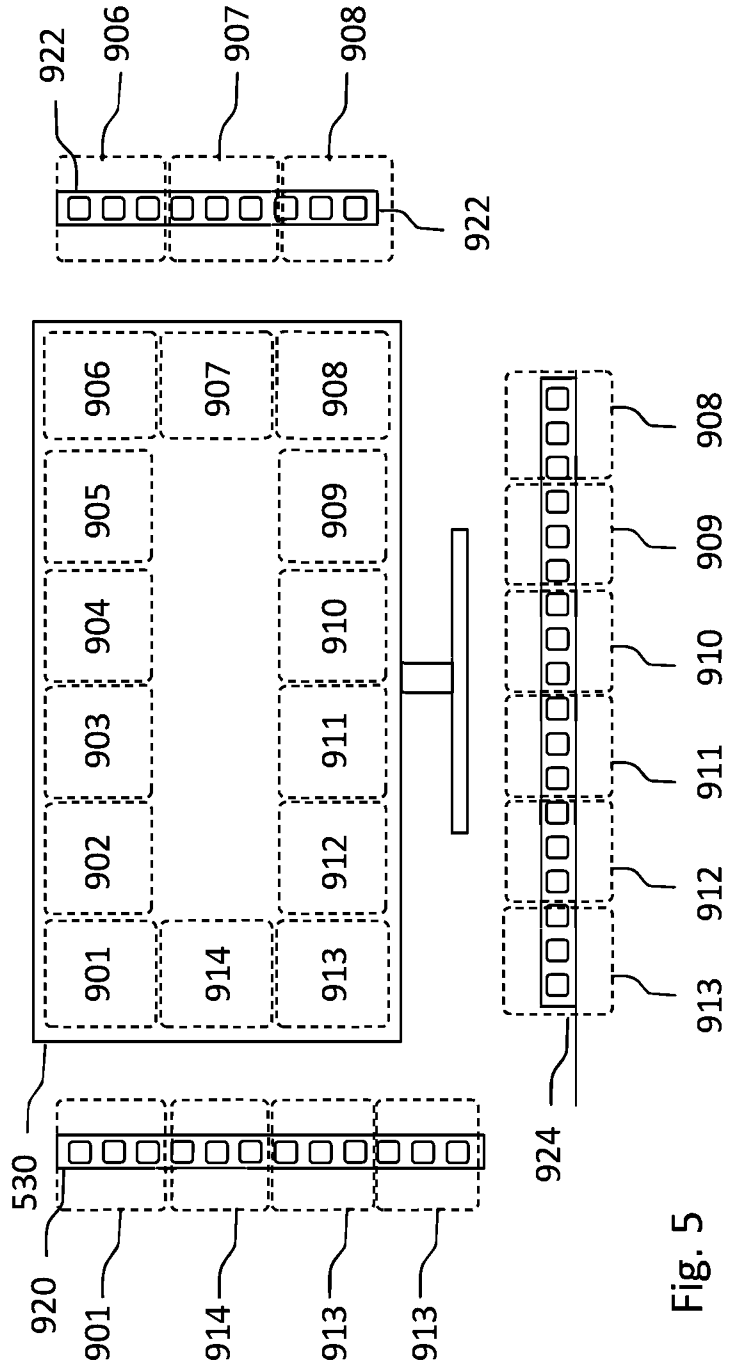
FIG. 5 shows schematically an example of a lighting system wherein parts of a display correspond to lighting control groups.

FIG. 5 illustrates an example wherein parts of a display correspond to lighting control groups. The configuration module 106 may be configured to determine the lighting control groups for the segments of the lighting devices 920, 922, 924 based on their positions relative to the display 530 (e.g. based on the positions of the segments of the corresponding virtual representations relative to the position of the virtual representation of the display). In this example, the display 530 has been divided into 14 parts 901-914, each corresponding to a lighting control group. The top two segments of the first lighting device 920 have been grouped into lighting control groups 901, 914, and the bottom two segments of the first lighting device 920 have been grouped into control group 913 based on their position. The segments of the second lighting device 922 (which is shorter and has less segments that the first lighting device 920) have been grouped into lighting control groups 906-908 based on their position. The segments of the third lighting device 924 have been grouped into lighting control groups 908-913 based on their position. As a result, when the lighting devices are controlled based on media content being rendered on the display 530, the light settings of the segments correspond to the colors of the media content.

The control system 102 may further comprise a user interface configured to receive user input indicative of the grouping of the different segments of the plurality of individually controllable segments into the different lighting control groups. The user may, for example, provide an input to adjust the size, number and/or location of the subareas 502, 504, 506, 508, 510 (see for example FIG. 4*a*). Alternatively, the user may, for example, select segments (e.g. by selecting them on a display 702) of different lighting devices to add the selected segments to a specific lighting control group. The user interface may enable the user to add or remove lighting control groups.

Figure 6:
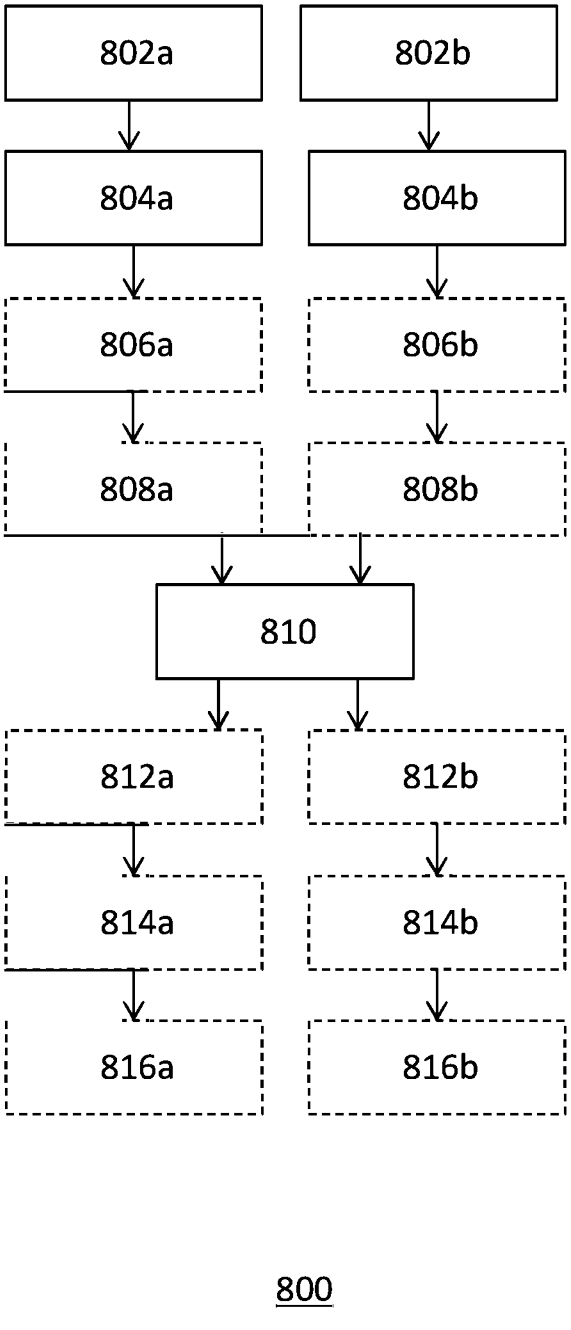
FIG. 6 shows schematically a method of configuring a plurality of lighting devices of a lighting system.

FIG. 6 shows schematically an example of method 800 of configuring a plurality of lighting devices of a lighting system, each lighting device comprising a memory and a plurality of individually controllable segments, each segment comprising one or more light sources, the method comprising:

for each lighting device of the plurality of lighting devices, grouping 802*a* 802*b* different segments of the plurality of individually controllable segments into different lighting control groups, and communicating 804, via one or more communication units, grouping information to each respective lighting device to cause the respective lighting device to store the respective grouping information in its memory, the grouping information being indicative of the respective lighting control groups into which the different segments have been grouped, and communicating 810, via the one or more communication units, a broadcast command to the plurality of lighting devices, the broadcast command defining respective light settings for the respective lighting control groups.

The method may further comprise:

receiving 806*a*, 806*b*, by each of the plurality of lighting devices, the respective grouping information, storing 808*a*, 808*b*, by each of the plurality of lighting devices, the respective grouping information in its memory, receiving 812*a*, 812*b*, by each of the plurality of lighting devices, the broadcast command, determining 814*a*, 814*b*, by each of the plurality of lighting devices, which segment to control according to which light setting based on the control command and based on the grouping information, and controlling 816*a*, 816*b*, by each of the plurality of lighting devices, one or more light sources of each segment according to the respective light setting.

The steps 802*a*, 802*b*, 804*a*, 804*b* and 810 may be executed by computer program code of a computer program product when the computer program product is run on one or more processing units of a computing device, such as the configuration module 106 and the control module 108 of the control system 102. The steps 806*a*, 808*a*, 812*a*, 814*a*, 816*a*, 806*b*, 808*b*, 812*b*, 814*b* and 816*b* may be executed by computer program code of a computer program product when the computer program product is run on one or more processing units of respective computing devices, such as the controllers 206, 306 of the lighting devices 200, 300.

The steps 802*a* and 804*a* may be executed by the configuration module 106 of control system 102 for a first lighting device 200, and the steps 802*b* and 804*b* may be executed by the configuration module 106 of the control system 102 for a second lighting device 300. Step 810 may be executed by the configuration module 106 of the control system 100. Steps 806*a*, 808*a*, 812*a*, 814*a* and 816*a* may be executed by the controller 206 of the first lighting device 200, and the steps 806*b*, 808*b*, 812*b*, 814*b* and 816*b* may be executed by the controller 306 for of the second lighting device 300.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A control system for configuring a plurality of lighting devices of a lighting system, each lighting device having a memory and a plurality of individually controllable segments, each segment having one or more light sources, the control system comprising:

one or more communication units configured to wirelessly communicate with the plurality of lighting devices;

a configuration module configured to:

for each lighting device of the plurality of lighting devices, changeably group different segments of the plurality of individually controllable segments into different lighting control groups, and communicate, via the one or more communication units, grouping information to each respective lighting device to cause the respective lighting device to store the respective grouping information in its memory, the grouping information being indicative of the respective lighting control groups into which the different segments of the respective lighting device have been grouped; and a control module configured to communicate, via the one or more communication units, a single broadcast command to the plurality of lighting devices, the single broadcast command defining respective different light settings for at least two different lighting control groups of the lighting control groups, such that the single broadcast command causes segments belonging to different lighting control groups to be controlled according to different light settings;

wherein each respective lighting device of the plurality of lighting devices is configured to, upon receiving the single broadcast command, determine, based on the grouping information stored in its memory, which segment of the respective lighting device to control according to which of the respective light settings defined by the single broadcast command, and to control one or more light sources of each segment according to the respective light setting.

2. The control system of claim 1, wherein at least one first segment of a first lighting device of the plurality of lighting devices and at least one second segment of a second lighting device of the plurality of lighting devices are grouped in the same lighting control group.

3. The control system of claim 1, wherein the number of groups is limited, and wherein the maximum number of lighting control groups is smaller than the number of segments of the plurality of lighting devices, and wherein the configuration module configured to group at least two segments in the same lighting control group.

4. The control system of claim 1, wherein the configuration module is further configured to:

for each lighting device of the plurality of lighting devices, determine adjustment levels for one or more segments of the respective lighting device, the adjustment levels defining adjustments of the light output of one or more light sources of the respective segment, and communicate the adjustment levels to each respective lighting device to cause the respective lighting device to store the respective adjustment levels in its memory.

5. The control system of claim 4, wherein the adjustment levels define an adjustment of a color, brightness and/or saturation of the light output.

6. The control system of claim 4, wherein the configuration module is further configured to obtain information indicative of locations of the lighting devices relative to a surface to be illuminated by the respective lighting devices, and to determine the adjustment levels based on the locations of the lighting devices relative to the surface to be illuminated by the respective lighting devices.

7. The control system of claim 1, wherein the configuration module is further configured to:

for each lighting device of the plurality of lighting devices, determine an adjustment level for the respective lighting device, the adjustment level defining adjustments of the light output of light sources of the lighting device, and communicate the adjustment levels to each respective lighting device to cause the respective lighting device to store the respective adjustment levels in its memory.

8. The control system of claim 1, wherein the configuration module is configured to determine the grouping of the different segments into the different lighting control groups based on positions of the lighting devices and/or their segments.

9. The control system of claim 1, further comprising a user interface configured to receive user input indicative of the grouping of the different segments of the plurality of individually controllable segments into the different lighting control groups.

10. The control system of claim 1, wherein a light setting defined by the single broadcast command comprises an off-setting for a respective lighting control group.

11. A lighting system comprising:

a plurality of lighting devices, each comprising a memory and a plurality of individually controllable segments, each segment comprising one or more light sources; and the control system of claim 1;

wherein each lighting device is configured to:

receive the respective grouping information, store the respective grouping information in its memory, receive the single broadcast command, determine which segment to control according to which light setting based on the control command and based on the grouping information, and control one or more light sources of each segment according to the respective light setting.

12. The lighting system of claim 11, wherein one or more of the plurality of lighting devices are light source arrays.

13. The control system of claim 1, wherein the configuration module is configured to communicate a plurality of different grouping information sets to each respective lighting device to cause the respective lighting device to store the plurality of different grouping information sets in its memory, and wherein the control system is further configured to communicate an activation command to the plurality of lighting devices to cause each lighting device to activate a selected one of the plurality of different grouping information sets stored in its memory.

14. The control system of claim 1, wherein the configuration module is further configured to, after the grouping information has been stored in the memory of the respective lighting device, update the grouping information and communicate the updated grouping information, via the one or more communication units, to the respective lighting device to cause the respective lighting device to replace the previously stored grouping information in its memory with the updated grouping information.

15. The control system of claim 1, wherein the configuration module is further configured to:

obtain area information indicative of a plurality of subareas of a space in which the plurality of lighting devices are located, each subarea defining one or more of the different lighting control groups, and determine the grouping of the different segments into the different lighting control groups based on positions of the different segments relative to the plurality of subareas.

16. A method of configuring a plurality of lighting devices of a lighting system, each lighting device having a memory and a plurality of individually controllable segments, each segment having one or more light sources, the method comprising:

for each lighting device of the plurality of lighting devices, changeably grouping different segments of the plurality of individually controllable segments into different lighting control groups;

communicating, via one or more communication units, grouping information to each respective lighting device to cause the respective lighting device to store the respective grouping information in its memory, the grouping information being indicative of the respective lighting control groups into which the different segments of the respective lighting device have been grouped; and communicating, via the one or more communication units, a single broadcast command to the plurality of lighting devices, the single broadcast command defining respective different light settings for at least two different lighting control groups of the lighting control groups, such that the single broadcast command causes segments belonging to different lighting control groups to be controlled according to different light settings;

wherein each respective lighting device of the plurality of lighting devices, upon receiving the single broadcast command, determines, based on the grouping information stored in its memory, which segment of the respective lighting device to control according to which of the respective light settings defined by the single broadcast command, and controls one or more light sources of each segment according to the respective light setting.

17. The method of claim 16, further comprising the steps of:

receiving, by each of the plurality of lighting devices, the respective grouping information;

storing, by each of the plurality of lighting devices, the respective grouping information in its memory;

receiving, by each of the plurality of lighting devices, the single broadcast command;

determining, by each of the plurality of lighting devices, which segment to control according to which light setting based on the control command and based on the grouping information; and controlling, by each of the plurality of lighting devices, one or more light sources of each segment according to the respective light setting.

18. A non-transitory computer readable medium comprising computer program code to perform the method of claim 16 when run on one or more processors.

* * * * *